United States Patent
Dollar, II et al.

[19]

[11] Patent Number: 6,031,699
[45] Date of Patent: Feb. 29, 2000

[54] ARC FAULT DETECTOR APPARATUS, MEANS AND SYSTEM

[75] Inventors: Charles Randall Dollar, II, Norcross; Elton C. Johnson, Decatur, both of Ga.

[73] Assignee: Siemens Energy & Automation, Inc., Alpharetta, Ga.

[21] Appl. No.: 09/197,869

[22] Filed: Nov. 23, 1998

[51] Int. Cl.[7] .................................................. H02H 3/00
[52] U.S. Cl. ............................ 361/42; 361/45; 361/79; 361/86
[58] Field of Search ................................. 361/42, 78, 45, 361/79, 86, 87, 93.1, 93.6, 102; 324/536

[56] References Cited

U.S. PATENT DOCUMENTS

| | | |
|---|---|---|
| 5,121,282 | 6/1992 | White . |
| 5,185,685 | 2/1993 | Tennies et al. . |
| 5,223,795 | 6/1993 | Blades . |
| 5,432,455 | 7/1995 | Blades . |
| 5,434,509 | 7/1995 | Blades . |
| 5,452,223 | 9/1995 | Zuercher et al. . |
| 5,459,630 | 10/1995 | MacKenzie et al. . |
| 5,561,605 | 10/1996 | Zuercher et al. . |
| 5,682,101 | 10/1997 | Brooks et al. . |
| 5,691,869 | 11/1997 | Engel et al. . |
| 5,729,145 | 3/1998 | Blades . |
| 5,818,671 | 10/1998 | Seymour et al. ..................... 361/42 |

OTHER PUBLICATIONS

Harry W. Ng et al. Innovative Distribution Fault Location Development (11 pgs.) (No Date).

J.P. Steiner et al. An Automated Fault Locating System (12 pgs.) (No Date).

Walter L. Weeks et al. Surface Detection and Interpretation of Transient Signals On Underground Power Distribution Systems (20 pgs.) 1994 (No Month).

*Primary Examiner*—Michael J. Sherry
*Attorney, Agent, or Firm*—J Marc Asperas

[57] ABSTRACT

A sputtering arc fault detector (10) for a system having an electrical conductor (14) carrying current to a load. The sputtering arc fault detector includes a current monitor (64) coupled to the conductor for generating a variable signal responsive to behavior of the current in the conductor. A level detector (58) is coupled to the monitor and generates a first pulse when the variable signal exceeds a first level. A step detector (62) is coupled to the monitor and is responsive to rapid step increases of the variable signal. The step detector generates a second pulse when the variable signal exceeds a second level. An arc verifier (48), which is coupled to the level detector and the step detector, combines the first and second pulses, and generates a fault signal when the combined pulses exceed a third level.

12 Claims, 3 Drawing Sheets

ARC FAULT DETECTOR APPARATUS, MEANS AND SYSTEM

TECHNICAL FIELD

The present invention relates, in general, to arc fault detectors and, more specifically, to sputtering arc fault detectors using high pass filtering techniques.

BACKGROUND OF THE INVENTION

There are various conditions that may cause an arc fault. Corroded, worn or aged wiring or insulation, worn power cords, old wall outlets with insufficient contact pressure, electrical stress from repeated overloading, etc., may result in an arc fault. These conditions may damage the insulation of the wiring and create excessive heating temperatures. Arc faults may result in a fire depending on various conditions, such as if combustible materials are in close proximity.

There are also various conditions that may result in a false arc fault. For example, the occurrence of an arc fault in one branch circuit of a power distribution system may generate a false arc in another branch circuit. As a result, circuit breakers in more than one branch circuit may erroneously trip. Another example is a relatively noisy load such as an electric drill creating a high frequency disturbance in the circuit, which may appear to be an arc fault.

There are two types of arc faults that may occur in a home. A first type is a high-energy arc that may be related to high current faults; a second type is a low current arc that may be related to persistent momentary contact of electrical conductors. The first type may result from inadvertent connection between a line conductor and neutral conductor or a line conductor and ground. The first type may draw current that is above the rated capacity of the circuit, arcing as the contacts are physically joined.

The other type of arc fault, the momentary contact of electrical conductors, may be considered more problematic. Since the current in the arc may be limited to less than the trip rating of an associated circuit breaker, such arcs may become persistent without observation and may result in certain conditions. Contact arcs may be caused by springs in switches that become worn which, in turn, may reduce the forces that hold electrical contacts together. As the electrical contacts heat and cool down, the conductors may touch and separate repeatedly, thereby possibly creating arcs known as "sputtering arcs."

Contact arcs or sputtering arcs may also be observed in contacts which are made from different materials. For example, aluminum wiring which contacts copper wiring may oxidize at the contact points. In this case a non-conductive layer may build up over time between the contact points and arcing may result. Sputtering arcs may also be observed in extension cords having insufficient current carrying capacity. As the plug is heated by resistance heating, insulating materials around the contacts may eventually melt and flow into the contact area, preventing proper contact from being made. The current in the conductors may produce magnetic repulsion forces which may push the conductors apart, resulting in an arc. The arc may be extinguished as the current passes through zero. Mechanical or electro-static forces may bring the conductors back into contact, and the cycle may be repeated.

It is believed that various circuit breakers are not specifically designed to guard against sputtering arcs. Special purpose detectors have been designed to detect sputtering arcs and, when detected, trip the circuit breakers. Some detectors are believed to depend on the sputtering arcs exceeding a predetermined current or voltage threshold before tripping the circuit breaker; other detectors are believed to depend on the sputtering arcs having a specific high frequency signature. Still other detectors are believed to depend on the sputtering arcs producing a wideband high frequency noise ranging from 10 kHz to 1 GHz while the arc is conducting current. These detectors may require that no noise be produced while the arc is not conducting current, i.e., during the gaps between arc conduction. These detectors use various processing techniques to analyze the repetitive patterns in the noise.

It is believed that a need still exists for a sputtering arc fault detector that does not depend on the frequency content of the noise generated by the arc or on relatively involved analysis techniques to determine the arc signature characteristics.

SUMMARY OF THE INVENTION

To meet this and other needs, and in view of its purposes, the present invention provides a fault detector that monitors rapid transition of current flow in conjunction with current magnitude. In one embodiment, a sputtering arc fault detector is provided for a system having an electrical conductor carrying current to a load. The sputtering arc fault detector includes a current monitor coupled to the conductor for generating a variable signal responsive to behavior of the current in the conductor. A level detector is coupled to the monitor and generates a first pulse when the variable signal exceeds a first level. A step detector is coupled to the monitor and is responsive to rapid step increases of the variable signal. The step detector generates a second pulse when the variable signal exceeds a second level. An arc verifier, which is coupled to the level detector and the step detector, combines the first and second pulses, and generates a fault signal when the combined pulses exceed a third level. Furthermore, the arc verifier includes a transistor having first and second terminals that define a principal conduction path and a third terminal that controls conduction through the path. The first terminal is coupled to the level detector, the third terminal is coupled to the step detector, and the second terminal provides an output signal which represents a combination of the first and second pulses. A capacitor is coupled to the second terminal, and charges in response to the combined pulses. A comparator is coupled to receive and compare the charge to the third level. The fault signal is generated by the comparator when the charge exceeds the third level. The capacitor charges at a first rate and discharges at a second rate which is slower than the first rate. The comparator includes a hysteresis circuit which holds the fault signal when the charge exceeds the third level.

Another object of the invention is to provide a sputtering arc fault detector for a system having an electrical conductor carrying current to a load, said sputtering arc fault detector comprising: a current monitor coupled to the conductor for generating a variable signal responsive to behavior of said current in said conductor; a level detector coupled to said monitor and generating a first pulse when said variable signal exceeds a first level; a step detector coupled to said monitor and responsive to rapid step increases of said variable signal, said step detector generating a second pulse when said variable signal exceeds a second level; and an arc verifier coupled to said level detector and said step detector for combining said first pulse and said second pulse, said arc verifier generating a fault signal when said combined pulses exceed a third level.

Another object of the invention is to provide the sputtering arc fault detector described above wherein said arc verifier includes a transistor having first and second terminals that define a principal conduction path and a third terminal that controls conduction through said path, said first terminal being coupled to said level detector, said third terminal being coupled to said step detector, and said second terminal providing an output signal which represents a combination of said first and second pulses, a capacitor coupled to said second terminal, said capacitor charging responsive to said combined pulses, and a comparator coupled to receive and compare said charge to said third level, wherein said fault signal is generated by said comparator when said charge exceeds said third level.

Another object of the invention is to provide the sputtering arc fault detector described above wherein said capacitor charges at a first rate and discharges at a second rate which is slower than said first rate.

Another object of the invention is to provide the sputtering arc fault detector described above wherein said comparator includes a hysteresis circuit, and said fault signal is held when said charge exceeds said third level.

Another object of the invention is to provide the sputtering arc fault detector described above wherein said hysteresis circuit includes: a resistor coupled to an input of said comparator for modifying said third level, and a transistor having fourth and fifth terminals that define a principal conduction path and a sixth terminal that controls conduction through said path, said fourth and fifth terminals being coupled to said resistor, and said sixth terminal being coupled to an output of said comparator, wherein said third level is modified to a lower potential level when said fault signal is generated.

Another object of the invention is to provide the sputtering arc fault detector described above wherein said step detector includes a high pass filter coupled to said current monitor, and a first window comparator having an input side coupled to said high pass filter, and an output side coupled to said arc verifier, wherein said high pass filter provides an edge signal to said input side when said rapid step increase occurs, and said first window comparator provides said second pulse when said edge signal exceeds said second level.

Another object of the invention is to provide the sputtering arc fault detector described above wherein said level detector includes a second window comparator having an input side coupled to said current monitor, and an output side coupled to said arc verifier, wherein said second window comparator provides said first pulse when said variable signal exceeds said first level.

Another object of the invention is to provide the sputtering arc fault detector described above wherein said monitor includes a current transformer coupled to said conductor, a node connecting said monitor to said level detector and step detector, and a buffer between said current transformer and said node.

Another object of the invention is to provide the sputtering arc fault detector described above further including a circuit breaker for interrupting current flow to said load, a SCR circuit coupled to said arc verifier, and a solenoid coupled between said SCR circuit and said circuit breaker, wherein said SCR circuit is conditioned to trip said circuit breaker when said fault signal is generated.

Another object of the invention is to provide the sputtering arc fault detector described above wherein said electrical conductor includes a line conductor and a neutral conductor coupled across said load, said sputtering arc fault detector further including a differential current monitor coupled to said line and neutral conductors for generating a differential signal responsive to behavior of said current in said line and neutral conductors, a fault level detector coupled to said differential current monitor which generates a ground fault signal when said differential signal exceeds a fourth level, and a further SCR circuit coupled between said fault level detector and said solenoid, wherein said further SCR circuit is conditioned to trip said circuit breaker when said ground fault signal exceeds said fourth level.

A further object of the invention is to provide a method for detecting a sputtering arc fault in a system having an electrical conductor carrying current to a load, said method comprising the steps of: a) monitoring the current of the conductor and generating a variable signal responsive to behavior of said current in said conductor; b) measuring said variable signal in magnitude and generating a first pulse when said magnitude exceeds a first level; c) detecting a rapid step increase of said variable signal, and generating a second pulse when said step increase exceeds a second level; and d) combining said first and second pulses to generate a third pulse when said third pulse exceeds a third level.

A further object of the invention is to provide the method described above wherein step (d) includes charging a capacitor responsive to said third pulse, comparing said charge in magnitude to said third level, and generating said fault signal when said magnitude exceeds said third level.

A further object of the invention is to provide the method described above wherein said charging is at a first rate and includes discharging said capacitor at a second rate which is slower than said first rate.

A further object of the invention is to provide the method described above including the step of holding said fault signal when said charge exceeds said third level.

A further object of the invention is to provide the method described above wherein said holding includes the step of modifying said third level to a lower magnitude when said fault signal is generated.

A further object of the invention is to provide the method described above wherein step (c) includes the step of high pass filtering said variable signal, and generating said second pulse in response to said high pass filtered variable signal.

Still another object of the invention is to provide a sputtering arc fault detector for a system having an electrical conductor carrying current to a load, said sputtering arc fault detector comprising: a current monitor coupled to said conductor for generating a variable signal responsive to behavior of said current in said conductor; a level detector coupled to said monitor and generating a first pulse when said variable signal exceeds a first level; a high pass filter having one end coupled to said current monitor and a further end responsive to a rapid step increase of said variable signal; a step detector coupled to said further end and generating a second pulse when said rapid step increase exceeds a second level; a transistor having first and second terminals that define a principal conduction path and a third terminal that controls conduction through said path, said first terminal being coupled to said level detector, said third terminal being coupled to said step detector, and said second terminal providing an output signal which represents a combination of said first and second pulses; a capacitor coupled to said second terminal, said capacitor charging responsive to said combined pulses; and a comparator coupled to receive and compare said charge to a third level, said comparator generating a fault signal when said charge exceeds said third level.

Still another object of the invention is to provide a sputtering arc fault detector for a system having an electrical conductor carrying current to a load, said sputtering arc fault detector comprising: a current monitor coupled to said conductor for generating a variable signal responsive to behavior of said current in said conductor; a level detector coupled to said monitor and generating a first pulse when said variable signal exceeds a first level; a high pass filter having one end coupled to said current monitor and a further end responsive to a rapid step increase of said variable signal; a step detector coupled to said further end and generating a second pulse when said rapid step increase exceeds a second level; a transistor having first and second terminals that define a principal conduction path and a third terminal that controls conduction through said path, said first terminal being coupled to said level detector, said third terminal being coupled to said step detector, and said second terminal providing an output signal which represents a combination of said first and second pulses; a capacitor coupled to said second terminal, said capacitor charging responsive to said combined pulses; a comparator coupled to receive and compare said charge to a third level, said comparator generating a fault signal when said charge exceeds said third level; a circuit breaker for interrupting current flow to said load; a SCR circuit coupled to said comparator; and a solenoid coupled between said SCR circuit and said circuit breaker; wherein said SCR circuit is conditioned to trip said circuit breaker when said fault signal is generated.

It is understood that the foregoing general description and the following detailed description are exemplary, but are not restrictive of the invention.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1:
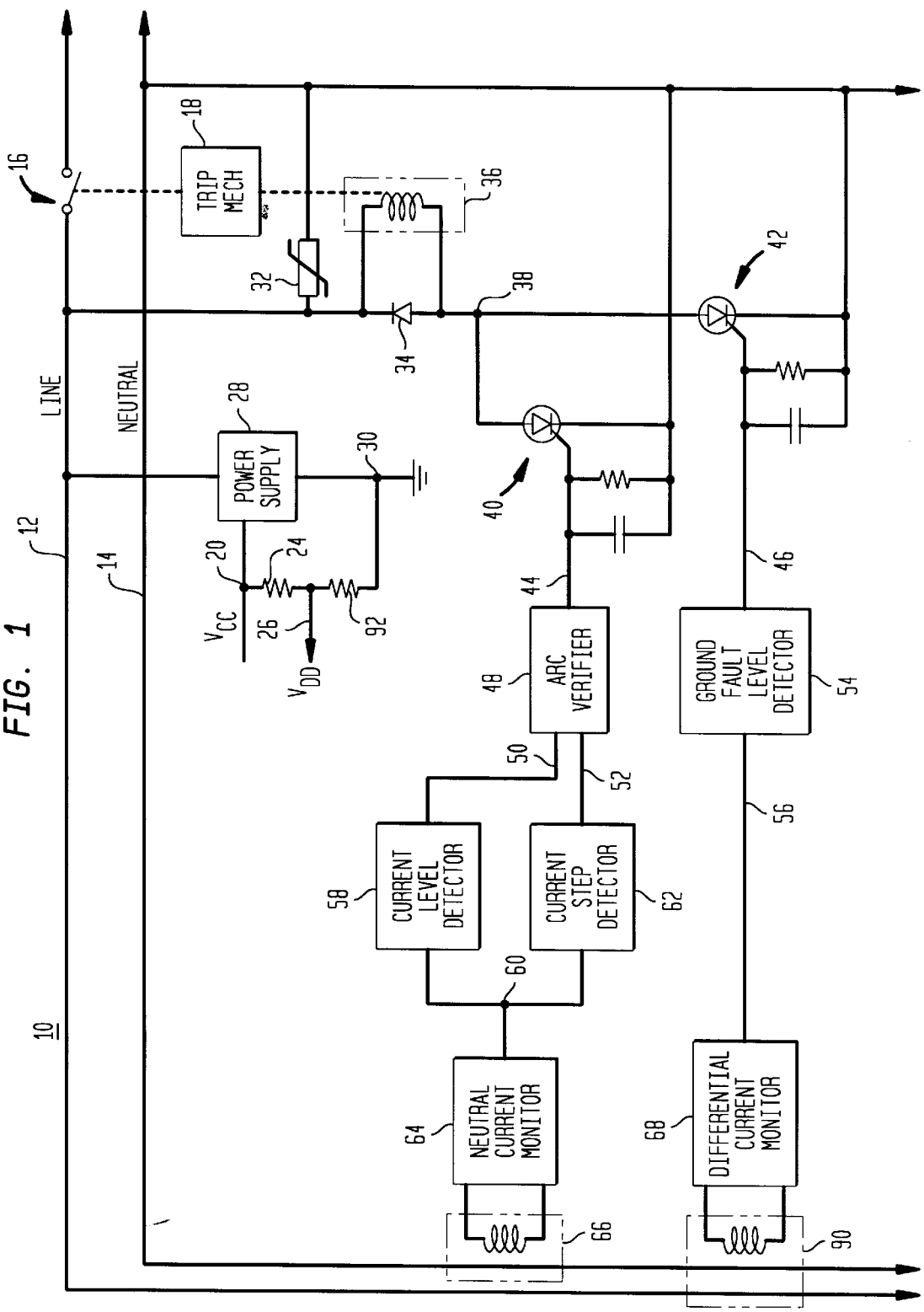
FIG. 1 is a schematic circuit diagram, partially in block diagram form, of an arc fault detector in accordance with the invention.

Shown in FIG. 1 is an exemplary embodiment of a fault detector 10. As shown, fault detector 10 combines an arc fault interrupt (AFI) sensor 66 with a differential sensor 90 to monitor the current drawn by an electric load (not shown). Sensor 90 is coupled to line conductor 12 and neutral conductor 14, and sensor 66 is coupled to neutral conductor 14. As described below, neutral current monitor 64, current level detector 58, current step detector 62 and arc verifier 48, in combination, are designed to protect against certain sputtering arc faults occurring between the line conductor and neutral conductor. As is also described below, differential current monitor 68 and ground fault level detector 54, in combination, are designed to protect against certain over currents drawn by the load and line to ground faults occurring in the electric system.

Although not shown in FIG. 1, it will be understood that the electric system may have a voltage source from a power utility company supplying 120 volts between the line conductor and the neutral conductor, all at, for example, 60 Hz. The invention is not limited to such example, and may be applied to any ac system operating at any voltage and frequency, including, for example, 240 volts, 480 volts and 660 volts, and 50, 60 and 400 Hz.

If a sputtering arc condition is determined to be present, arc verifier output 44 goes high to turn on SCR circuit 40. Turning on SCR circuit 40 provides current to energize solenoid 36, with current drawn from the line and neutral conductors. Solenoid 36, when actuated, trips the circuit breaker to open contacts 16 using trip mechanism 18. It will also be appreciated that AFI sensor 66 is a torroidal current transformer having a secondary transformer sensing current flowing through the neutral conductor. Differential sensor 90 is also a torroidal current transformer which senses current flowing through neutral conductor 14 and line conductor 12, both of which are coupled through the center of the torus. In this configuration, only differential current between the conductors is sensed.

If a ground fault is determined to be present, ground fault level detector output 46 goes high to turn on SCR circuit 42. Turning on SCR circuit 42 also provides current to energize solenoid 36 and open contacts 16. Thus, SCR circuit 40 and SCR circuit 42 are logically OR-ed at junction 38 to operate solenoid 36 and trip mechanism 18. It will be appreciated that SCR circuit 40 and SCR circuit 42 are protected from surges on the line and neutral conductors by metal oxide varistor (MOV) 32 connected across line conductor 12 and neutral conductor 14. Furthermore, diode 34 is intended to suppress surges across solenoid 36.

Also shown in FIG. 1 is regulated power supply 28 which is connected between line conductor 12 and ground terminal 30. Regulated power supply 28 rectifies 60 Hz ac line voltage into a steady state dc voltage of Vcc, which is provided at node 20. Using resistive voltage divider networks, such as resistor 24 and resistor 92, shown connected in series between Vcc node 20 and ground terminal 30, other dc voltages such as VDD may be provided at node 26. As described below, Vcc and VDD voltages are provided to various circuits of fault detector 10 for operating purposes.

Detection of sputtering arc faults, which is accomplished by the combination of neutral current monitor 64, current level detector 58, current step detector 62 and arc verifier 48, is now described by reference to FIGS. 1 and 2. (Like numerals refer to like elements.) Neutral current monitor 64 includes operational amplifier 110 which has a gain dependent on the resistive values of resistor 108 and resistor 104. In the exemplary embodiment, the gain of operational amplifier 110 is set to unity. As a result, voltage swings across resistor 102 may be seen with unity gain at the output of operational amplifier 110, or at node 60. Since the non-inverting side of operational amplifier 110 is connected to VDD at node 26, the output of operational amplifier 110 has a dc level of VDD. In the exemplary embodiment, VDD is one-half of Vcc. In essence, operational amplifier 110 is a buffer which monitors the current fluctuation in AFI sensor 66, and provides the same signal fluctuation at output node 60, but shifted in dc level. Thus, as an example, the signal output at node 60 may be a 60 Hz sinusoidal signal centered at a VDD level. The peak-to-peak level of the signal will, of course, depend on the current magnitude sensed by AFI sensor 66. Finally, capacitor 106 presents a low impedance to high frequency current fluctuations that may be sensed by AFI sensor 66, for example high frequency fluctuations due to sputtering. In this manner, high frequency signals, above 60 Hz fluctuation, are amplified by operational amplifier 110 and transferred to the output at node 60.

Current level detector 58 is now described. Current level detector 58 includes a pair of operational amplifiers, comparator 116 and comparator 120. The output of neutral current monitor 64 is fed to the pair of comparators that form a window comparator. Specifically, the output at node 60 is applied to the non-inverting input of the comparator 116 and the inverting input of comparator 120. The other inputs of the comparators receive two different reference voltages which set the limits of the window, i.e., the only signals that pass through the window comparator are those that are greater than the reference voltage set by the inventing input of comparator 116 and those that are less than the reference voltage set by the non-inverting input of comparator 120. The reference voltage of comparator 116 is set by the voltage divider network of resistor 114 and resistor 126; the reference voltage of comparator 120 is set by the voltage divider network of resistor 112 and resistor 124. In the exemplary embodiment, both reference voltages are set to the same magnitude but with opposite polarity relative to VDD.

Finally, the signals that pass through comparators 116 and 120 are logically OR-ed by diodes 118 and 122 to provide a combined output at node 50. As an example of the operation of current level detector 58 reference is now made to FIGS. 3A and 3B. As shown, a low amplitude 60 Hz sinusoid 250 and a high amplitude 60 Hz sinusoid 252 are output from neutral current monitor 64. Moreover, current waveforms 254 and 256 may be indicative of sputtering arcs sensed in the neutral conductor. In response to the signals shown in FIG. 3A, current level detector 58 provides (1) pulse output 258 during the positive portion of waveform 254 which exceeds the reference voltage, VREF, and (2) pulse output 260 during the negative portion of waveform 256 which is below the reference voltage, VDD-VREF. Since a wider portion of waveform 252 is above VREF than the portion of waveform 254 or 256 pulse 251 is wider than 258 or pulse 260. Thus, current level detector 58 provides an output at node 50 that is indicative of the period of time that the magnitude of the current in neutral conductor 14 exceeds a predetermined threshold.

Current step detector 62 is now described. Current step detector 62 includes another pair of operational amplifiers, comparator 140 and comparator 142. The output terminal of neutral current monitor 64 is ac-coupled through capacitor 130 to the pair of comparators 140 and 142 that form a second window comparator. Capacitor 130 and resistor 132 form a high-pass filter. The second window comparator operates in a fashion similar to the window comparator described above. The reference voltage of comparator 140 is set by the voltage divider network of resistor 134 and resistor 144; the reference voltage of comparator 142 is set by the voltage divider network of resistor 136 and resistor 146. In the exemplary embodiment both reference voltages are set to the same magnitude but opposite polarities relative to VDD. The signals that pass through comparators 140 and 142 are logically OR-ed by way of resistor 138 to provide a combined output at node 52.

Figure 3A:
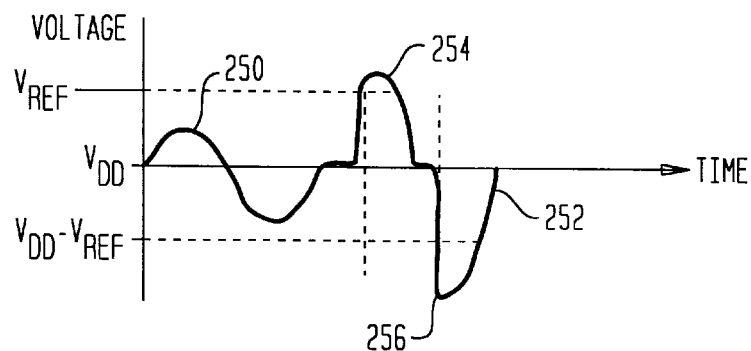
FIGS. 3A–3D are waveform diagrams illustrating the voltages produced at various portions of the arc fault detector of FIGS. 1 and 2.
Figure 3B:
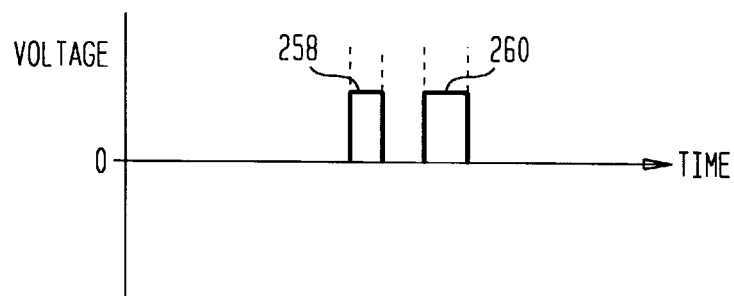
Figure 3C:
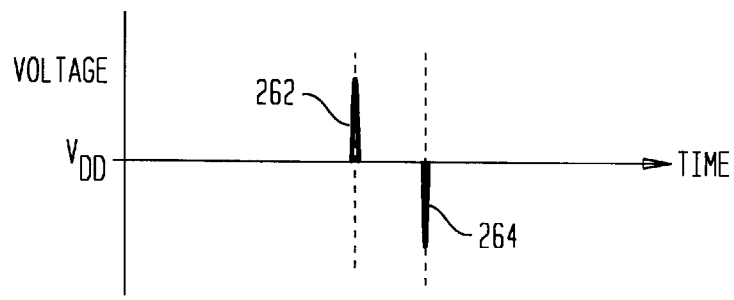
Figure 3D:
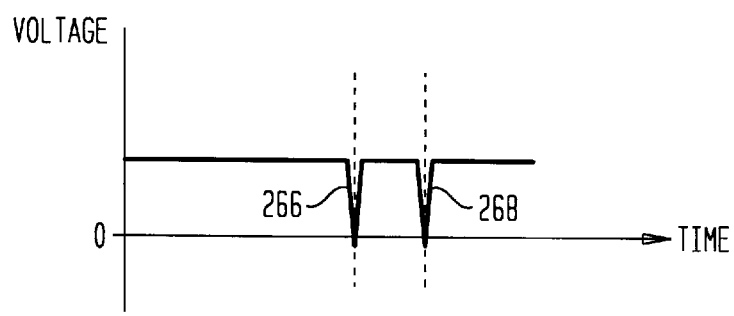

As an example of the operation of current step detector 62, reference is now made to FIGS. 3A, 3C and 3D. As shown, waveforms 254 and 256 are passed by the high-pass filter to the input side of the window comparator to capture the relatively fast transitions of waveforms 254 and 256 (shown in FIG. 3C as edge signals 262 and 264 ). For every leading edge that exceeds the positive or negative reference voltage of the window comparator an output is provided at node 52. This may be seen in FIG. 3D as a series of multiple, negative-going pulses 266 and 268. (The pulses transition from a high-level to a low-level.) Thus, current step detector 62 provides an output signal at node 52 that is indicative of the period of time that the current in neutral conductor 14 experiences fast rising leading edges which exceed a predetermined threshold.

Lastly, arc verifier 48 is described. The output signal of current level detector 58 at node 50 is logically AND-ed with the output of current step detector 62 at node 52 by PNP transistor 152. It will be appreciated that transistor 152 is turned-on, when both a positive signal at node 50 and a less positive signal at node 52 exist. The logically AND-ed output signal of transistor 152 quickly charges capacitor 160 through resistor 154. The capacitor slowly discharges through resistor 162. In the exemplary embodiment, resistor 154 is 2.43 KΩ, resistor 162 is 750 KΩ and capacitor 160 is 0.1 μF. Thus, an analog integrator is formed for the number of half-cycles of arcing detected at neutral conductor 14. As more half-cycles of arcing are detected, capacitor 160 charges to a higher magnitude and discharges slowly when no arcing is detected.

The voltage across capacitor 160 is provided as an input to the non-inverting side of comparator 156. Establishing a voltage reference for comparator 156 is the resistive network formed by resistors 150, 164 and 168. In the exemplary embodiment, resistors 150, 164 and 168 are 47.5 KΩ, 10.0 KΩ and 15.0 KΩ, respectively. When the voltage across capacitor 160 exceeds a predetermined level, comparator 156 sends an output signal, by way of resistor 158, to node 44 which fires SCR circuit 40. Furthermore, comparator 156 sends an output signal, by way of resistor 166, which turns-on NPN transistor 170, thereby shorting resistor 168 to a source of reference potential (e.g. ground). In turn, the voltage reference for comparator 156 is now lowered. Thus, a hysteresis circuit is provided to keep SCR circuit 40 in a fired-state. Thus, the latched or holding condition exists, until the voltage across capacitor 160 decays to a value less than the new threshold level.

In summary, arc verifier 48 provides an output to fire SCR circuit 40 only when four conditions have occurred. First, the magnitude of the current in neutral conductor 14 exceeds a first predetermined threshold. Second, the leading edge of the current waveform is sharp enough to pass through the high pass filter. Third, the magnitude of the leading edge of the current waveform exceeds a second predetermined threshold. Fourth, a sufficient number of these high magnitude leading edges have occurred before the SCR circuit 40 fires.

Figure 2:
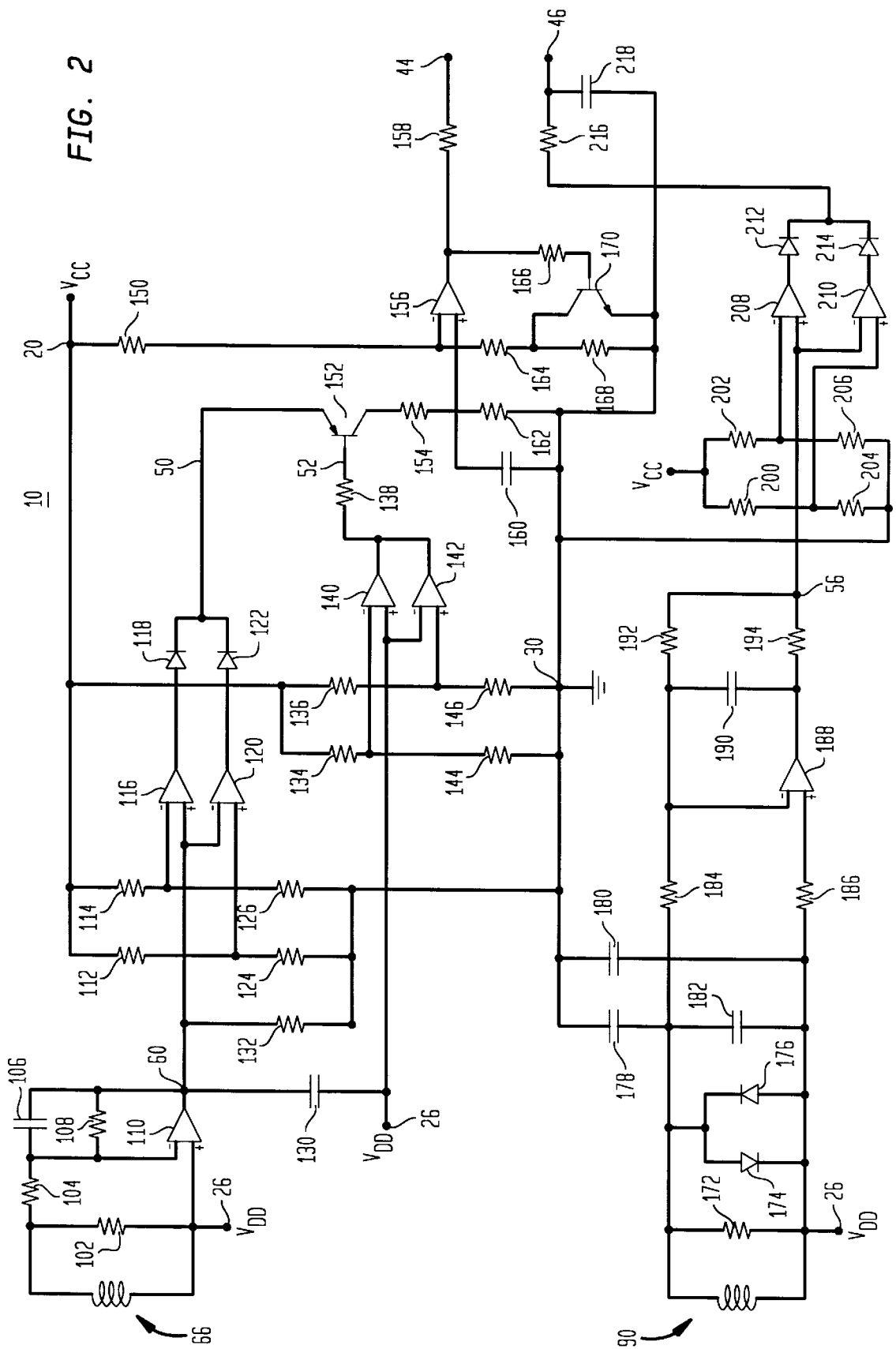
FIG. 2 is a schematic circuit diagram of portions of the arc fault detector of FIG. 1.

Still referring to FIGS. 1 and 2, differential current monitor 68 and ground fault level detector 54 are now described. The signal sensed by differential sensor 90 is placed across resistor 172 and is generally a relatively low-level voltage. A clipping network, formed from oppositely connected diodes 174 and 176, protects amplifier 188 from voltage excursions above a predetermined level, for example 600 mV. For further protection, coupling capacitors 178, 180 and 182 are connected as shown to divert any relatively high frequency signals present at the input to amplifier 188. The differential signal across resistor 172 is amplified by amplifier 188. In the exemplary embodiment, input resistors 184 and 186 are each 3.01 KΩ, where as output resistors 192 and 194 are 301 KΩ and 30.1 KΩ, respectively, resulting in an amplification gain of 100 times. It will be appreciated that capacitor 190 reduces the high frequency gain of amplifier 188.

The amplified differential signal from differential current monitor 68 is provided to ground fault level detector 54, the latter having an input node 56 and an output node 46. Ground fault level detector 54 includes a pair of comparators 208 and 210 forming a window comparator. This window comparator operates in a manner substantially similar to the window comparators previously described. The voltage reference comparator 208 is determined by the resistive network of resistors 202 and 206; the voltage reference for comparator 210 is determined by the resistive network of resistors 200 and 204. In the exemplary embodiment, the voltage references are set to have the same magnitude but opposite polarity relative to VDD. Finally, the output from comparator 208 and the output from comparator 210 are logically OR-ed by diodes 212 and 214, and provided through that firing of SCR circuit 42. It will be appreciated that firing of SCR circuit 42 is independent of firing SCR circuit 40. The following table provides values for the exemplary embodiment shown in FIG. 2.

| Resistor | Value (K-ohms) |
|---|---|
| 102 | 10.0 |
| 104 | 10.0 |
| 108 | 10.0 |
| 112 | 34.8 |
| 114 | 20.0 |
| 132 | 10.0 |
| 124 | 20.0 |
| 126 | 34.8 |
| 134 | 75.0 |
| 136 | 56.2 |
| 138 | 22.1 |
| 150 | 47.5 |
| 154 | 2.43 |
| 144 | 56.2 |
| 146 | 75.0 |
| 162 | 5000.0 |
| 164 | 10.0 |
| 166 | 75.0 |
| 168 | 15.0 |
| 166 | 75.0 |
| 158 | 10.0 |
| 172 | 3.01 |
| 184 | 3.01 |
| 186 | 3.01 |
| 192 | 301.0 |
| 194 | 30.1 |
| 200 | 47.5 |
| 202 | 30.1 |
| 204 | 30.1 |
| 206 | 47.5 |
| 216 | 10.0 |

| Capacitor | Value (pF) |
|---|---|
| 106 | 220 |
| 130 | 470 |
| 160 | 10 |
| 178 | 470 |
| 180 | 470 |
| 182 | 2200 |
| 190 | 220 |
| 218 | 220 |

| Voltage | Value |
|---|---|
| VCC | 9.0v |
| VDD | 4.5v |

Although illustrated and described herein with reference to certain specific embodiments, the present invention is nevertheless not intended to be limited to the details shown. Rather, various modifications may be made in the details within the proper scope of the claims and without departing from the spirit of the invention. It will be understood, for example, that the present invention is not limited to only a fault detector for a household load, which carries 60 Hz current from a 120 volt supply. Rather this invention may be extended to commercial and industrial loads carrying current at various frequencies from various voltage supplies.

Furthermore, although the exemplary embodiment in FIG. 2 shows the use of bipolar transistors, it will be understood that MOSFETs may also be used. The description provided before is the same except that the gate, source and drain terminals of the MOSFET correspond to the base, emitter and collector terminals of the bipolar transistor. Of course, any other suitably appropriate switching device may also be used.

What is claimed is:

1. A sputtering arc fault detector for a system having an electrical conductor carrying current to a load, said sputtering arc fault detector comprising:

a current monitor coupled to the conductor for generating a variable signal responsive to behavior of said current in said conductor, a level detector coupled to said monitor and generating a first pulse when said variable signal exceeds a first level, a step detector coupled to said monitor and responsive to rapid step increases of said variable signal, said step detector generating a second pulse when said variable signal exceeds a second level, and an arc verifier coupled to said level detector and said step detector for combining said first pulse and said second pulse, said arc verifier generating a fault signal when said combined pulses exceed a third level.

2. The sputtering arc fault detector of claim 1 wherein said arc verifier includes a transistor having first and second terminals that define a principal conduction path and a third terminal that controls conduction through said path, said first terminal being coupled to said level detector, said third terminal being coupled to said step detector, and said second terminal providing an output signal which represents a combination of said first and second pulses, a capacitor coupled to said second terminal, said capacitor charging responsive to said combined pulses, and a comparator coupled to receive and compare said charge to said third level, wherein said fault signal is generated by said comparator when said charge exceeds said third level.

3. The sputtering arc fault detector of claim 2 wherein said capacitor charges at a first rate and discharges at a second rate which is slower than said first rate.

4. The sputtering arc fault detector of claim 3 wherein said comparator includes a hysteresis circuit, and said fault signal is held when said charge exceeds said third level.

5. The sputtering arc fault detector of claim 4 wherein said hysteresis circuit includes:

a resistor coupled to an input of said comparator for modifying said third level, and a transistor having fourth and fifth terminals that define a principal conduction path and a sixth terminal that controls conduction through said path, said fourth and fifth terminals being coupled to said resistor, and said sixth terminal being coupled to an output of said comparator, wherein said third level is modified to a lower potential level when said fault signal is generated.

6. The sputtering arc fault detector of claim 5 wherein said step detector includes a high pass filter coupled to said current monitor, and a first window comparator having an input side coupled to said high pass filter, and an output side coupled to said arc verifier, wherein said high pass filter provides an edge signal to said input side when said rapid step increase occurs, and said first window comparator provides said second pulse when said edge signal exceeds said second level.

7. The sputtering arc fault detector of claim 6 wherein said level detector includes a second window comparator having an input side coupled to said current monitor, and an output side coupled to said arc verifier, wherein said second window comparator provides said first pulse when said variable signal exceeds said first level.

8. The sputtering arc fault detector of claim 7 wherein said monitor includes a current transformer coupled to said conductor, a node connecting said monitor to said level detector and step detector, and a buffer between said current transformer and said node.

9. The sputtering arc fault detector of claim 8 further including a circuit breaker for interrupting current flow to said load, a SCR circuit coupled to said arc verifier, and a solenoid coupled between said SCR circuit and said circuit breaker, wherein said SCR circuit is conditioned to trip said circuit breaker when said fault signal is generated.

10. The sputtering arc fault detector of claim 9 wherein said electrical conductor includes a line conductor and a neutral conductor coupled across said load, said sputtering arc fault detector further including a differential current monitor coupled to said line and neutral conductors for generating a differential signal responsive to behavior of said current in said line and neutral conductors, a fault level detector coupled to said differential current monitor which generates a ground fault signal when said differential signal exceeds a fourth level, and a further SCR circuit coupled between said fault level detector and said solenoid, wherein said further SCR circuit is conditioned to trip said circuit breaker when said ground fault signal exceeds said fourth level.

11. A sputtering arc fault detector for a system having an electrical conductor carrying current to a load, said sputtering arc fault detector comprising:

a current monitor coupled to said conductor for generating a variable signal responsive to behavior of said current in said conductor, a level detector coupled to said monitor and generating a first pulse when said variable signal exceeds a first level, a high pass filter having one end coupled to said current monitor and a further end responsive to a rapid step increase of said variable signal, a step detector coupled to said further end and generating a second pulse when said rapid step increase exceeds a second level, a transistor having first and second terminals that define a principal conduction path and a third terminal that controls conduction through said path, said first terminal being coupled to said level detector, said third terminal being coupled to said step detector, and said second terminal providing an output signal which represents a combination of said first and second pulses, a capacitor coupled to said second terminal, said capacitor charging responsive to said combined pulses, and a comparator coupled to receive and compare said charge to a third level, said comparator generating a fault signal when said charge exceeds said third level.

12. A sputtering arc fault detector for a system having an electrical conductor carrying current to a load, said sputtering arc fault detector comprising:

a current monitor coupled to said conductor for generating a variable signal responsive to behavior of said current in said conductor, a level detector coupled to said monitor and generating a first pulse when said variable signal exceeds a first level, a high pass filter having one end coupled to said current monitor and a further end responsive to a rapid step increase of said variable signal, a step detector coupled to said further end and generating a second pulse when said rapid step increase exceeds a second level, a transistor having first and second terminals that define a principal conduction path and a third terminal that controls conduction through said path, said first terminal being coupled to said level detector, said third terminal being coupled to said step detector, and said second terminal providing an output signal which represents a combination of said first and second pulses, a capacitor coupled to said second terminal, said capacitor charging responsive to said combined pulses, a comparator coupled to receive and compare said charge to a third level, said comparator generating a fault signal when said charge exceeds said third level, a circuit breaker for interrupting current flow to said load, a SCR circuit coupled to said comparator, and a solenoid coupled between said SCR circuit and said circuit breaker, wherein said SCR circuit is conditioned to trip said circuit breaker when said fault signal is generated.

* * * * *